(12) United States Patent
Nobrega

(10) Patent No.: US 9,880,013 B2
(45) Date of Patent: Jan. 30, 2018

(54) METHOD AND SYSTEM FOR VEHICLE REFUELING

(71) Applicant: Ford Global Technologies, LLC, Dearborn, MI (US)

(72) Inventor: Giullian de Sousa e Nobrega, Melbourne (AU)

(73) Assignee: Ford Global Technologies, LLC, Dearborn, MI (US)

( * ) Notice: Subject to any disclaimer, the term of this patent is extended or adjusted under 35 U.S.C. 154(b) by 217 days.

(21) Appl. No.: 14/449,784

(22) Filed: Aug. 1, 2014

(65) Prior Publication Data

US 2016/0033293 A1     Feb. 4, 2016

(51) Int. Cl.
| | |
|---|---|
| G01C 21/34 | (2006.01) |
| G01C 21/36 | (2006.01) |
| G06F 19/00 | (2011.01) |
| G06G 7/70 | (2006.01) |
| G06G 7/76 | (2006.01) |
| G05D 7/00 | (2006.01) |
| G05D 11/00 | (2006.01) |
| F16K 24/00 | (2006.01) |

(52) U.S. Cl.
CPC ..... *G01C 21/3415* (2013.01); *G01C 21/3461* (2013.01); *G01C 21/3469* (2013.01); *G01C 21/3676* (2013.01)

(58) Field of Classification Search
CPC ............ G01C 21/3415; G01C 21/3469; G01C 21/3697; G05D 7/06; G06F 7/00
USPC .................. 701/423, 123; 700/282; 137/588
See application file for complete search history.

(56) References Cited

U.S. PATENT DOCUMENTS

| | | | |
|---|---|---|---|
| 8,240,136 B2 | 8/2012 | Kurtz et al. | |
| 8,315,788 B2 | 11/2012 | Surnilla et al. | |
| 2008/0141658 A1 | 6/2008 | Brown | |
| 2008/0306631 A1 | 12/2008 | Huang | |
| 2010/0012205 A1* | 1/2010 | Vandervoort | B60K 15/0406 137/588 |
| 2011/0137470 A1* | 6/2011 | Surnilla | G01C 21/26 700/282 |
| 2011/0167805 A1 | 7/2011 | Chen | |
| 2013/0125997 A1 | 5/2013 | Lawrence et al. | |
| 2013/0226443 A1* | 8/2013 | Scofield | B60R 16/0232 701/123 |

FOREIGN PATENT DOCUMENTS

WO        2012173798 A1        12/2012

\* cited by examiner

*Primary Examiner* — Mahmoud Ismail
(74) *Attorney, Agent, or Firm* — Julia Voutyras; McCoy Russell LLP

(57) ABSTRACT

Methods and systems are provided for improving urea fluid usage on a vehicle. Based on when a urea tank needs to be refilled relative to when a fuel tank needs to be refilled during a vehicle journey, one or more alternate driving routes are suggested based on the range of the fluid getting depleted. The suggested driving routes include refilling stations where the depleting fluid can be refilled.

19 Claims, 4 Drawing Sheets

METHOD AND SYSTEM FOR VEHICLE REFUELING

FIELD

The present description relates generally to methods and systems for smart fueling of vehicle fuel and urea tanks.

BACKGROUND/SUMMARY

Vehicle systems may include an engine with an exhaust gas treatment system coupled in its exhaust passage in order to control regulated emissions. In some examples, the exhaust gas treatment system may include a selective catalytic reduction (SCR) system in which an exhaust fluid or reductant, such as urea or ammonia, is added to the exhaust stream upstream of a catalyst such that $NO_x$ may be reduced by the catalyst. In such an example, the exhaust fluid may be held in an exhaust fluid storage tank. The level of exhaust fluid in the exhaust fluid storage tank may be monitored, such as via a dedicated sensor or based on a vehicle distance travelled since a last refill. Accordingly, the exhaust fluid storage tank may be periodically refilled.

One approach for exhaust fluid management is shown by Huang et al. in US 20080306631. Therein, when the exhaust fluid level in the storage tank reaches a lower limit, a distance travelable at the normal rate of exhaust fluid consumption is estimated. If the controller determines that a refill station is not available within the estimated distance, exhaust fluid dosing is adjusted to allow for more conservative use of the fluid.

However the inventors herein have identified potential issues with such an approach. As an example, due to limited availability of urea, there may be situations where the vehicle cannot reach a urea filling station before the storage tank is empty. When traveling in remote areas where area is not available within long distances, the customer may even need to carry a spare bottle of urea. As such, this may be messy and inconvenient. As another example, currently available urea sensors may not be highly sensitive or consistent. As a result, the information regarding reductant usage, range of urea availability in the tank, and internal volume may be incomplete. In addition, since the usage range for the urea fluid is not proportional to the storage tank, there may be confusion caused to the customer. Further confusion may be caused to the operator due the higher frequency with which the fuel tank needs to be refilled as compared to the exhaust fluid storage tank. Further still, due to the less frequent need for urea refilling, many refilling stations may only be configured to store fuel, and not urea. Consequently, even when a vehicle operator reaches a refilling station, urea may not be available for refilling. Overall, there may be situations where the exhaust fluid tank goes empty, degrading engine performance.

The inventors have recognized that at least some of the above issues may be addressed by a method for a vehicle system comprising: in response to a fluid level in each of an exhaust fluid tank and a fuel tank, providing a vehicle operator with one or more alternate driving route suggestions, the suggested driving route(s) including a refilling station. In this way, urea tank refilling may be synchronized with fuel tank refueling to better ensure that a vehicle is not operated with an empty urea tank.

As an example, a vehicle may be configured with a fuel tank for storing diesel fuel and an exhaust fluid storage tank for storing urea reductant. While the vehicle is travelling on a route to a defined destination, the controller may determine a rate of usage of each of the fuel and reductant based on operating conditions as well the planned route. The controller may further monitor a fluid level of the fuel tank and the exhaust fluid storage tank. Based on the predicted usage over the planned route, and the level of fluid in each tank relative to respective lower limits, the controller may determine if fuel and/or reductant refilling is required before the vehicle reaches the destination. If refilling of either tank is required, the controller may suggest one or more alternate driving routes to the destination via refilling stations where the required fluids are available. For example, a first alternate route via a first refilling station where at least diesel fuel is available may be suggested if the fuel tank is expected to reach the lower limit before the urea tank. If the urea tank is expected to reach the lower limit before the fuel tank, a second alternate route via a second, different refilling station where at least urea is available may be suggested. Further still, if each of the urea and diesel tank are expected to reach their lower limit, a third alternate route via a third refilling station where both diesel and urea are available may be suggested. The different routes may be selected based on the differential rate of fuel usage relative to reductant usage. In particular, the routes may adjust for the fact that fuel usage may require more frequent fuel tank refilling while reductant usage may require less frequent urea tank refilling. For example, the urea tank may need to be refilled once for every 3-4 times the fuel tank is refilled. The controller may use preferences stored in a user's profile to select routes and refilling stations. For example, the selections provided may be based on a user's preference for fuel price, urea price, fuel brand or dealer, urea brand or dealer, type of refilling facility available (bottle or pump) etc. Furthermore, the routing suggestions may be dynamically updated based on changes to fuel and urea as driving patterns and conditions change.

In this way, reductant refilling can be ensured and vehicle operation on an empty reductant tank can be pre-empted. By continually monitoring urea usage and updating a vehicle operator about urea levels and urea range, the operator may be influenced to drive more conservatively when urea levels are low. By synchronizing urea refilling and fuel tank refilling with navigational inputs to refilling stations selected on the fuel and urea ranges, refilling efficiency is improved. By enabling operators to share refilling details, such as via a social media community or hub, urea refilling information can be retrieved with less time wastage. In addition, fleet managers can have better control of their vehicles remotely and can allocate each one more efficiently depending on the fuel/exhaust fluid remaining for a specific job.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2A:
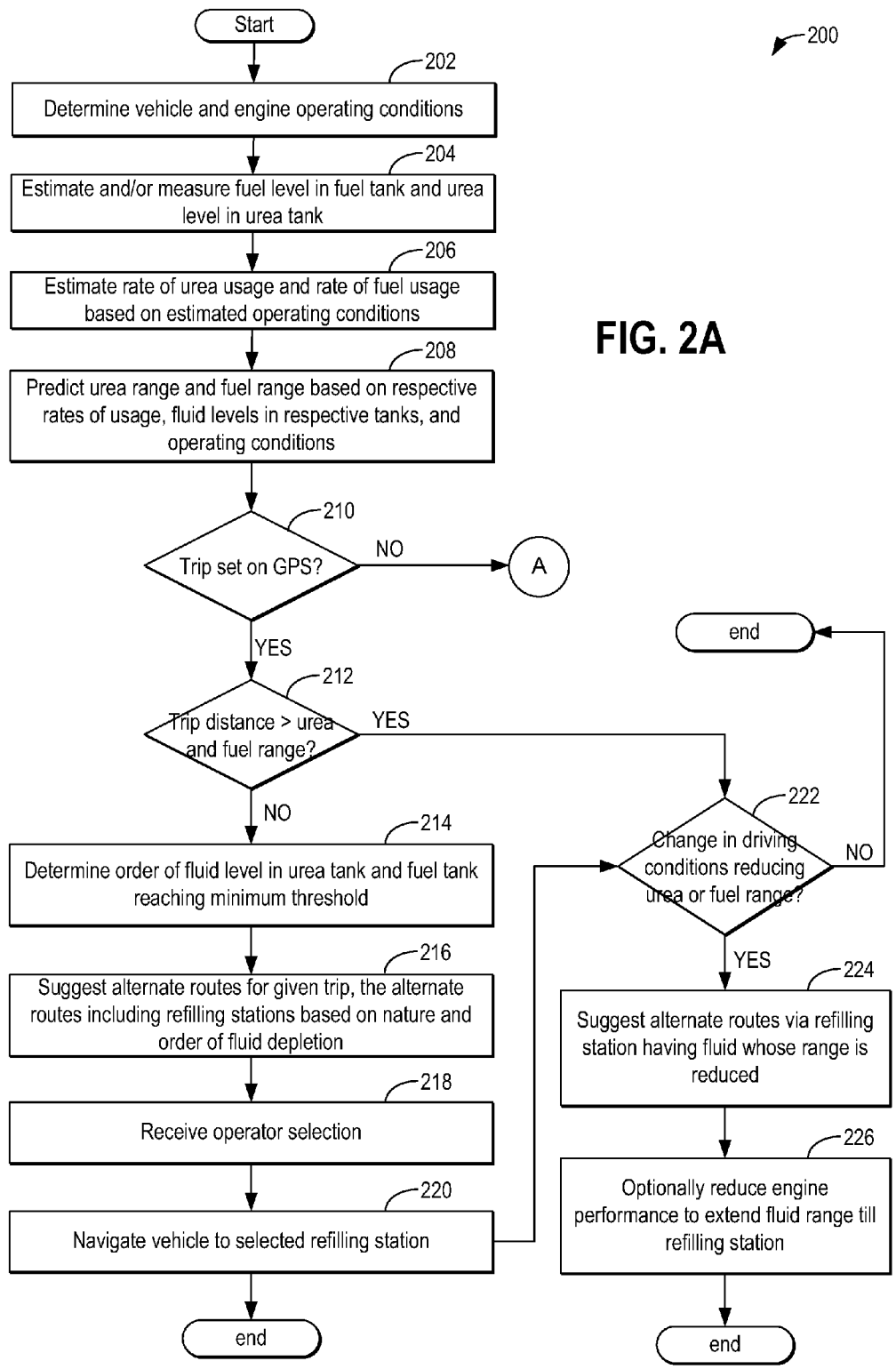
FIGS. 2A-B shows an example method for adjusting vehicle routing based on a fluid level in each of the exhaust fluid tank and the fuel tank.
Figure 2B:
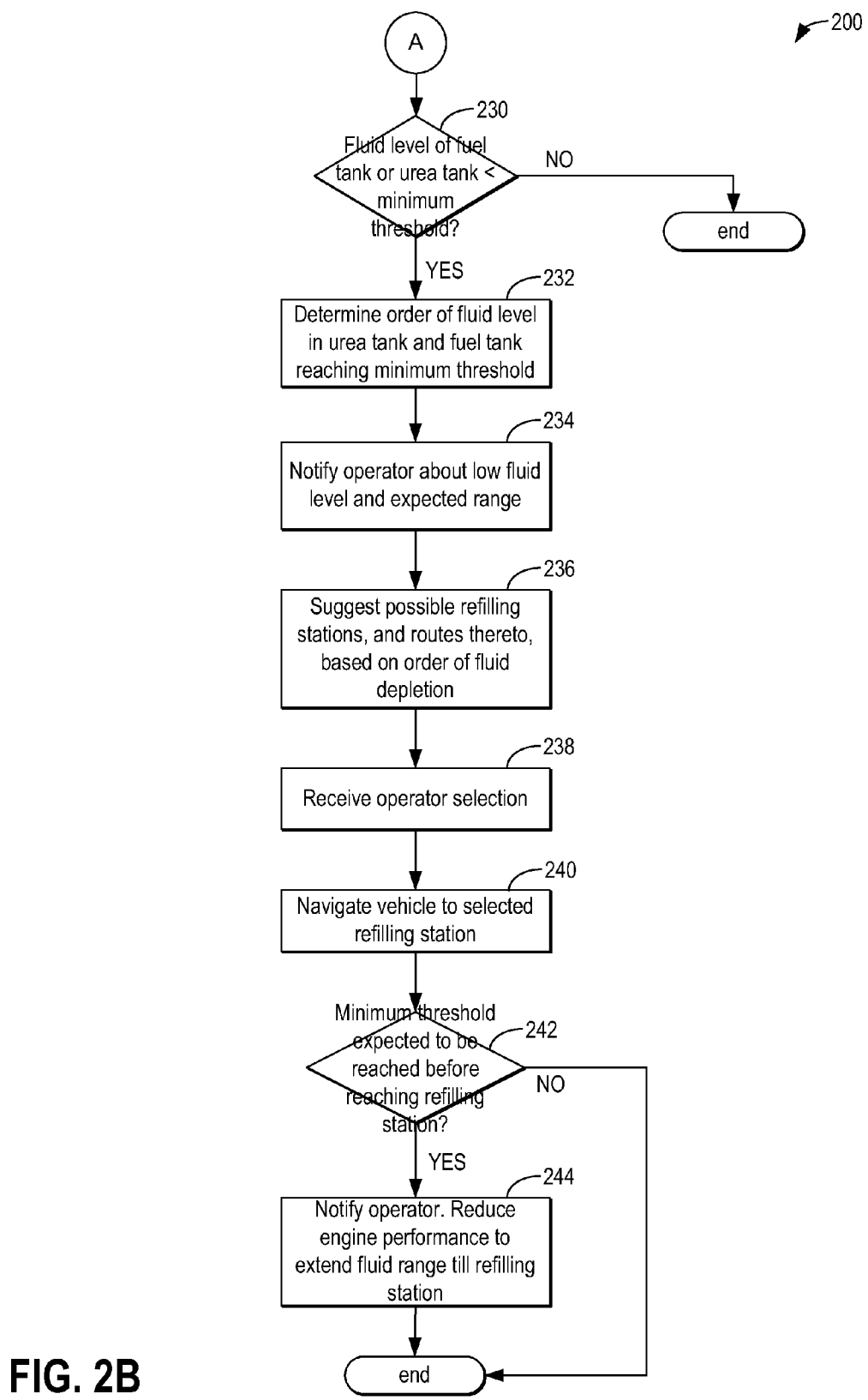
Figure 3:
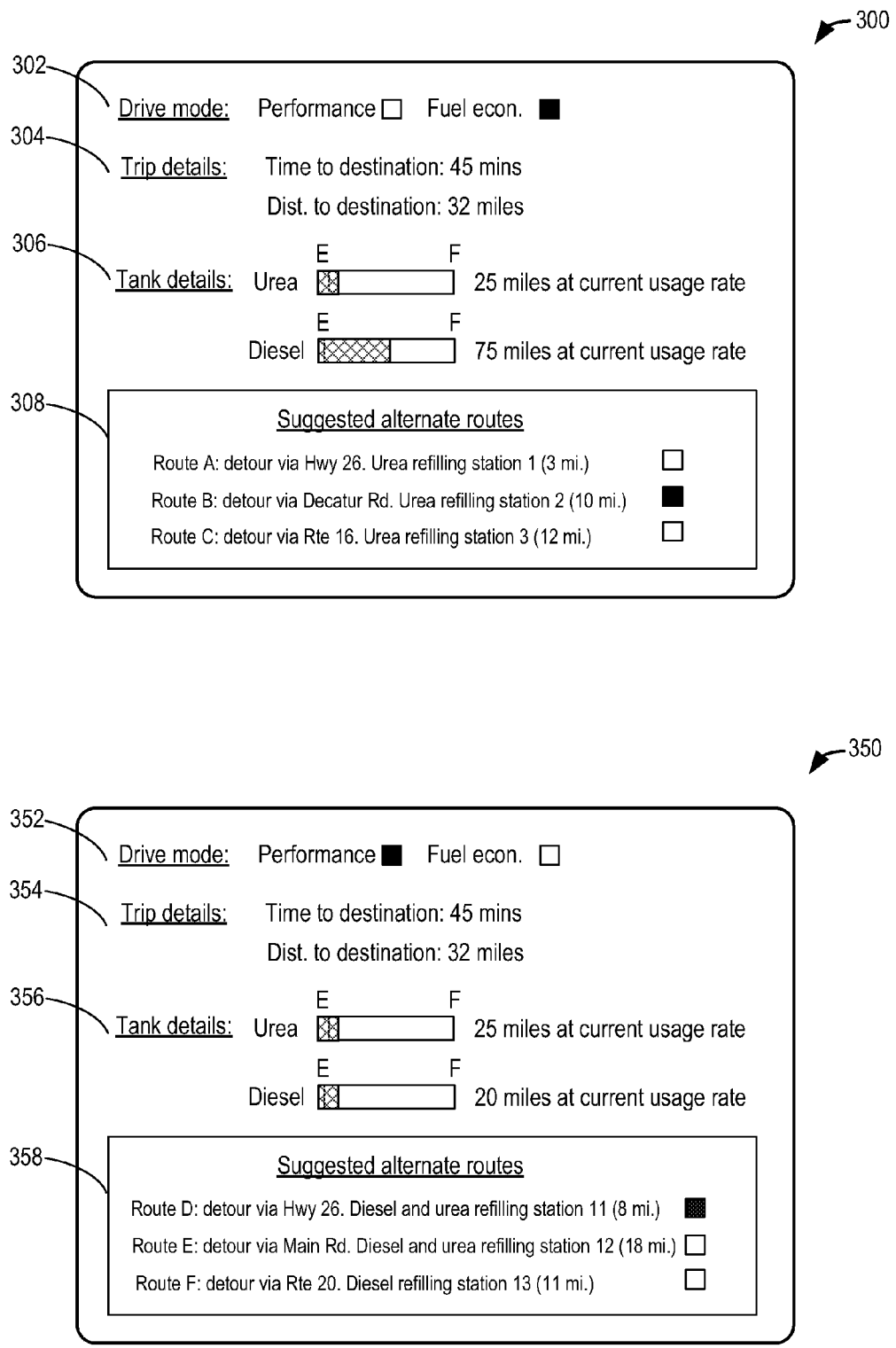
FIG. 3 shows an example adjustment of vehicle routing based on fluid levels in each of a diesel tank and a fuel tank.

Methods and systems are provided for coordinating refilling of a fuel tank and an exhaust fluid tank so as to ensure that a vehicle does not operate on an empty tank. A controller may be configured to perform a control routine, such as the routine of FIGS. 2A-B to provide one or more alternate driving routes to an operator in response to fluid levels in the fuel tank and/or the exhaust fluid tank getting close to a lower limit. The alternate driving routes suggested may include details for refilling stations, the routes and refilling stations selected based on whether fuel or exhaust fluid needs to be refilled first. Example rerouting operations to enable efficient refilling are shown at FIG. 3.

Figure 1:
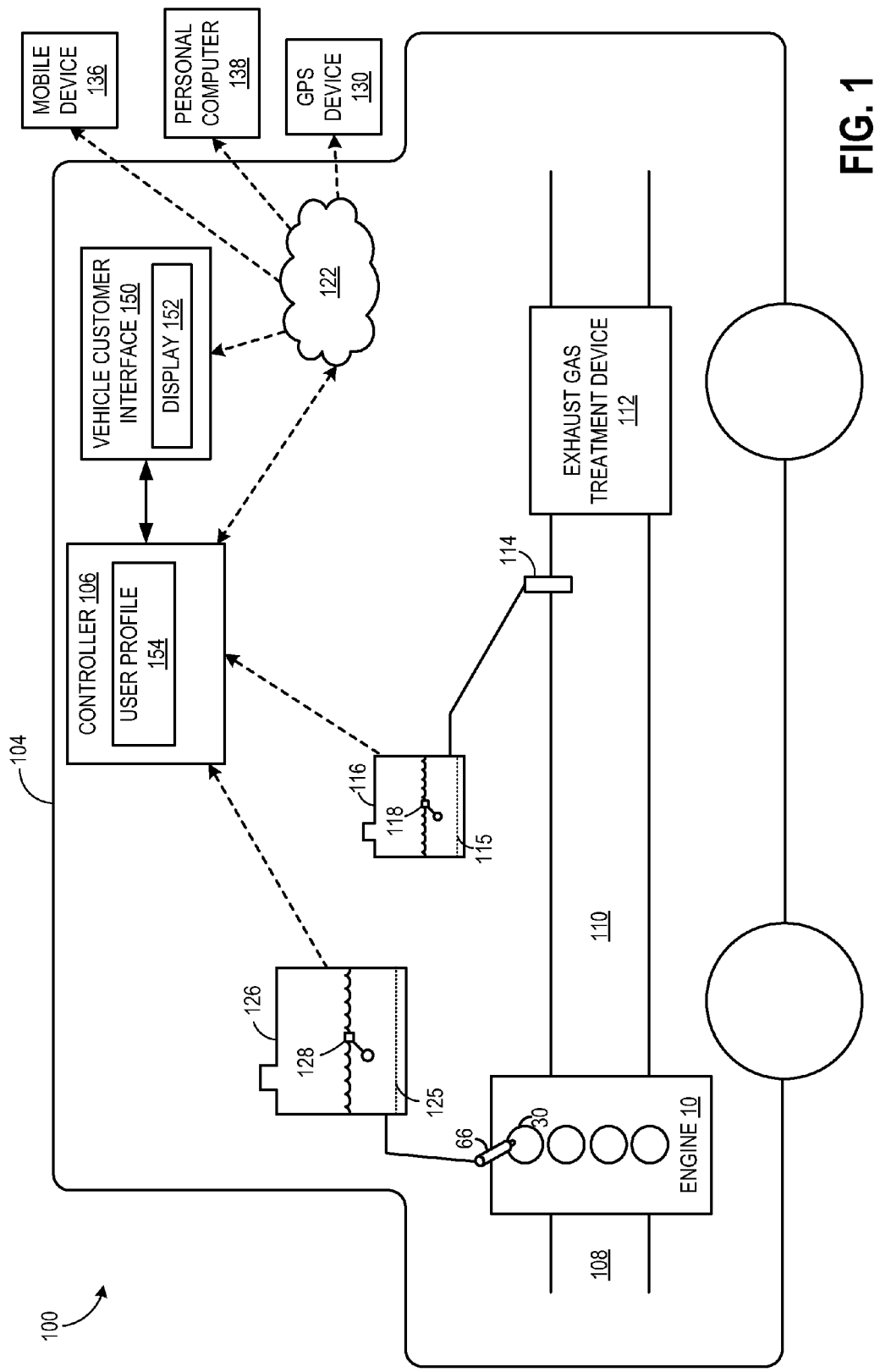
FIG. 1 is a schematic diagram of a vehicle system including a fuel tank and an exhaust fluid tank.

FIG. 1 shows a schematic diagram of a vehicle system 100. Vehicle system 100 includes engine 10 which may be included in a propulsion system of vehicle 104. Engine 10, as depicted, has four in-line cylinders 30, although alternate cylinder configurations may be possible. Fuel, such as liquid fuel, is delivered to cylinder 30 via fuel injector 66 which may be configured for direct or port injection. Fuel injector 66 receives fuel from a fuel system including fuel tank 126. In one example, the liquid fuel delivered to the engine includes diesel fuel. In alternate examples, the delivered fuel may include gasoline, bio-diesel, etc. The fuel system may include additional components such as fuel pumps, fuel rails, and fuel pressure sensors.

Engine 102 be controlled at least partially by a control system including controller 106 and by input from a vehicle operator via an input device (not shown). Intake air is inducted into engine 102 via intake passage 108, an exhaust gas resulting from combustion in engine 102 is exhausted via exhaust passage 110 eventually leading to a tailpipe (not shown) that eventually routes exhaust gas to the atmosphere.

A level of fluid (that is, fuel) in fuel tank 126 may be determined by fuel level sensor 128 which in the depicted example is configured as a float sensor. Fuel level sensor 128 may float on the surface of the liquid fuel in the tank and based on the position of the sensor, a controller may determine the volume of liquid fuel in the fuel tank. It will be appreciated that an indication of the liquid fuel level (that is, the fluid level in the fuel tank) may be provided to a vehicle operator based on a determination via measurement, calculation, or combination thereof. Controller 106 may generate a fuel level reading that may range between a full fuel storage tank and an empty fuel storage tank based on the received measurements and/or the determination. The indication may be displayed to the vehicle operator on a vehicle customer interface 150 including a display 152. Additionally or optionally, the indication may be displayed on a mobile/remote device that can access the information and take actions. In one example, on vehicles that do not have multifunctional display or are not GPS enabled, the vehicle operator can use the mobile device as the media center and interface. In other examples, the fleet controller can use a computer connected to the same network as the vehicle to have access to all data regarding fuel/exhaust fluid consumption of the controlled vehicles and plan the job/trip of each one according to the fuel/exhaust fluid usage. In addition to indicating whether the fuel tank is empty or full, a fuel level relative to a minimum fuel threshold 125 may also be indicated.

As shown, an exhaust gas treatment system including exhaust gas treatment device 112 is shown arranged along exhaust passage 110. In the example embodiment of FIG. 1, exhaust gas treatment device 112 may be a selective catalyst reduction (SCR) system, for example. In other examples, the exhaust gas treatment system may additionally or alternatively include a three way catalyst (TWC), a $NO_x$ trap, various other emission control devices, or combinations thereof. Further, as depicted, exhaust fluid injector 114 is disposed upstream of exhaust gas treatment device 112. Exhaust fluid injector 114 injects an exhaust fluid into the exhaust stream for reaction with $NO_x$ in exhaust gas treatment device 112 responsive to signals received from controller 106. The exhaust fluid may be a reductant, such as urea or ammonia.

Exhaust fluid injector 114 is supplied with exhaust fluid from exhaust fluid storage tank 116. Exhaust fluid storage tank 116 may be a reservoir suitable for holding the exhaust fluid throughout a range of temperatures, for example. Exhaust fluid storage tank 116 may be smaller than fuel tank 126, as depicted, or of the same size.

A level of fluid (that is, reductant) in exhaust fluid storage tank 116 (herein also referred to urea tank 116) may be determined by exhaust fluid level sensor 118 which in the depicted example is configured as a float sensor. Exhaust fluid level sensor 118 may float on the surface of the liquid reductant in the tank and based on the position of the sensor, a controller may determine the volume of liquid reductant in the exhaust fluid tank. It will be appreciated that an indication of the liquid exhaust fluid level (that is, the reductant level in the exhaust fluid tank) may be provided to a vehicle operator based on a determination via measurement, calculation, or combination thereof. Controller 106 may generate an exhaust fluid level reading that may range between a full reductant storage tank and an empty reductant storage tank based on the received measurements and/or the determination. The indication may be displayed to the vehicle operator on a vehicle customer interface 150 including a display 152 and/or on a mobile/remote device that can access the information and take actions. In one example, on vehicles that do not have multifunctional display or are not GPS enabled, the operator can use the mobile device as the media center and interface. In other example, fleet controller can use a computer connected to the same network as the vehicle to have access to all consumption of the controlled vehicles and plan the job/trip of each one according to the fuel/exhaust fluid usage. In addition to indicating whether the exhaust fluid tank is empty or full, an exhaust fluid level relative to a minimum exhaust fluid threshold 115 may be indicated.

The exhaust fluid level sensor may alternatively be configured as a magnetostrictive level sensor, an ultrasonic sensor, or a resistive chain level sensor, for example. Based on measurements of the exhaust fluid level sensor, and further based on vehicle operating conditions, various parameters may be determined, such as an exhaust fluid consumption or usage rate, an exhaust fluid range (that is, a distance that can be traveled before the exhaust fluid is depleted), as well as an exhaust fluid level in the storage tank relative to the minimum threshold before the completion of a trip.

In some vehicle systems, to reduce the potentially adverse effect of operating the engine system with reductant completely depleted from the exhaust fluid storage tank, the controller may be configured to restrict vehicle usage based on the exhaust fluid level in the exhaust fluid storage tank. In one example, the vehicle usage restriction may include a maximum permissible vehicle speed being limited (e.g., in US vehicle systems). In another example, the vehicle usage restriction may include engine output being limited or engine being stopped (e.g., in EU vehicle systems). Consequently, when the vehicle is operated in remote areas where reductant availability is limited, vehicle operators may need to carry a spare bottle of reductant on the vehicle while traveling.

Based on measurements of the fuel level sensor, and further based on vehicle operating conditions, various parameters may be determined, such as a fuel consumption or usage rate, a fuel range (that is, a distance that can be traveled before the fuel is depleted), as well as a fuel level in the fuel tank relative to the minimum threshold before the completion of a trip. An order of fluid depletion from the exhaust fluid tank and the fuel tank may be estimated based on the vehicle operating conditions. Further, the estimation may be dynamically adapted responsive to changes in vehicle operating conditions affecting the fluid usage rates and ranges. For example, as a vehicle operator shifts between a fuel economy mode of vehicle operation and a performance mode of vehicle operation, fuel and exhaust fluid usage rates and ranges may be dynamically updated.

Controller 106 may be a microcomputer including the following, although not shown in FIG. 1: a microprocessor unit, input/output ports, an electronic storage medium for executable programs and calibration values (e.g., a read only memory chip), random access memory, keep alive memory, and a data bus. Storage medium read-only memory may be programmed with computer readable data representing instructions executable by the microprocessor for performing the methods described below as well as other variants that are anticipated but not specifically listed. For example, the controller may receive communication (e.g., input data) from the various sensors, process the input data, and trigger the actuators in response to the processed input data based on instruction or code programmed therein corresponding to one or more routines. Example routines are described herein with reference to FIGS. 2A-B.

A user profile 154 for each vehicle operator may be stored in the memory of controller 106. The user profile may include user preferences learned based on user selections and user interactions with the vehicle customer interface 150. For example, the preferences may be learned based on interactions between the vehicle operator and selections listed on a vehicle display (e.g., a touch interactive display) located on a center console or dashboard of vehicle 104. The user preferences may include, in addition to preferences for vehicle settings (e.g., seat and rear-view mirror settings, vehicle entertainment and communication system settings, etc.), settings for refilling the fuel tank and the exhaust fluid storage tank. These may include, for example, fuel price, exhaust fluid price, refilling station preference (e.g., favorite refilling station), exhaust fluid dealer preference, fuel dealer preference, refilling location preference with respect to traffic and parking, etc. Further still, the preferences may be based on a refilling station ranking on an operator social network. The preferences may be uploaded to the user's profile from an operator mobile device 136 (e.g., smart phone) and/or personal computer 138 which is communicatively coupled to the controller via a network 122. Network 122 may include, for example, a wireless network or controller area network (CAN).

For example, after processing data from each of exhaust fluid level sensor 118 and fuel level sensor 128, and estimating a parameter, such as an average exhaust fluid consumption rate and range, and average fuel consumption rate and range, controller 106 may send a message to display 152 of the vehicle customer interface and/or on a mobile/remote device that can access the information and take actions to notify the operator or fleet manager of vehicle 104 of an imminent fluid depletion. In one example, the parameter may be displayed on vehicle display 124 (?), such as a dashboard or other vehicle display and/or on a mobile/remote device that can access the information and take actions. In another example, the message regarding the parameter may be sent directly to the mobile device 136 of the operator in the form of a text message, for example, or to personal computer 138 in the form of an email or to a fleet management application.

Controller 106 may also be communicatively coupled to a GPS device 130 (that is, any mobile device enabled with GPS feature) which may be positioned in the vehicle. In one example, the controller may be coupled to the GPS device via a communication module. The GPS device enables navigational input to be provided to the vehicle operator so that the vehicle can be driven to a destination along a selected route. In addition, alternate routing options may be received, as required, such as when vehicle operating conditions necessitate a change in trip route.

The inventors herein have recognized that urea usage and fuel usage are not linearly correlated. In addition to the difference in their usage rates, the difference in the size of their storage tanks results in the tanks needing refilling at different times and with different frequencies. In particular, a fuel tank may need to be refilled multiple times before a urea tank needs to be refilled. Due to the lack of a sensitive and constant level sensor, reductant volume and consumption is conventionally not shown accurately on a vehicle customer interface area. For these reasons, a vehicle operator may remember to refill the fuel tank, but may forget to refill the urea tank. As such, if the urea tank runs dry, engine performance is adversely affected. Thus, to improve urea fluid usage and enable a urea tank to not operate below its minimum threshold, a vehicle controller may monitor the fluid levels in the urea tank and the fuel tank, and provide driving suggestions to extend the urea range. For example, based on a destination and a driving route of the vehicle, and further based on an order of which of the fuel and the urea is expected to reach a minimum threshold before the destination is reached, alternate driving routes may be suggested to the destination. The alternate driving routes may be configured to reach the destination via a refilling station where the fluid getting depleted first can be refilled. As elaborated at FIGS. 2A-B, this may include suggesting a route via only a urea refilling station if the urea tank is expected to empty first, and suggesting a route via a fuel and urea refilling station if the fuel tank is expected to empty first. The route and refilling station suggestions may be further selected based on user preferences stored in an operator's user profile. In this way, depletion of an exhaust fluid tank can be preempted.

FIG. 2 shows a flow chart illustrating an example routine 200 for displaying alternate driving routes to an operator of a vehicle based on a consumption rate, or usage rate, of fuel in the fuel tank and exhaust fluid (such as urea) in the exhaust fluid tank. It will be appreciated that while the example routine of FIG. 2 is described with urea used as an example exhaust fluid and diesel used as an example fuel, this is not meant to be limiting. In alternate examples, the routines may be applied to any other suitable exhaust fluid and fuel combination.

At 202, the routine includes estimating and/or measuring vehicle and engine operating conditions. These may include, for example, vehicle speed, engine speed, manifold pressure and airflow, engine temperature, ambient conditions (ambient temperature, pressure, humidity), etc. The operating conditions may also include an operator selected vehicle mode of operation, such as a fuel economy mode or a performance mode. At 204, the routine includes estimating and/or measuring a fuel level in the fuel tank and a reductant level in the exhaust fluid storage tank. In one embodiment, the controller may estimate a diesel level in the fuel tank and a urea level in a urea tank. The fluid levels may be inferred based on the output of level sensors coupled to the respective tanks At 206, the routine includes estimating a rate of urea usage as well as a rate of fuel usage based on the estimated operating conditions. For example, based on whether the vehicle is being operated in a fuel economy mode or a performance mode, a rate of consumption of the diesel fuel in the fuel tank and a rate of consumption of the urea in the reductant tank may be determined, the fuel and urea usage higher during the performance mode as compared to the fuel economy mode.

At 208, the routine includes estimating each of a urea range and a fuel range based on the fluid levels in the storage tanks, as well as the estimated rates of fluid consumption. Specifically, the controller may predict a distance travelable by the vehicle before one or more of the urea level in the exhaust fluid tank reaches a minimum urea threshold and a fuel level in the fuel tank reaches a minimum fuel threshold. In one example, the minimum thresholds correspond to the tank being empty. In an alternate example, the minimum thresholds correspond to an above empty level, below which vehicle operation needs to be limited to preempt degradation. As such, the predicted ranges may be dynamically adjusted by the controller as the vehicle operating conditions change and/or as vehicle parameters affecting the distance travelable change. For example, the fuel range and/or the urea range may be dynamically decreased in response to the vehicle operator driving more aggressively or transitioning from the fuel economy mode to the performance mode.

At 210, it may be determined if a trip has been set on the vehicle's (or vehicle operator's) GPS device. For example, it may be determined if a GPS device coupled to the vehicle controller is providing navigational input to the vehicle operator (e.g., via a navigation or communication module) to enable the vehicle to be driven along a first planned route of a trip to a selected destination. If not, the routine may proceed to perform steps 230-244, shown as sub-routine A in FIG. 2B.

If a trip has been set on the GPS device, the routine proceeds to 212 to determine if the trip distance is greater than each of the fuel range and the urea range. That is, it may be determined if one or more of the fuel and urea is expected to reach their respective minimum threshold before the end of the trip. In addition, while on the trip, the controller may indicate a distance travelable by the vehicle on the current route based on the fluid level of the exhaust fluid tank and the fuel tank. This allows the vehicle operator to be kept continually appraised of a distance travelable under the given driving conditions with the given amounts of fuel and reductant.

If it is predicted that any one of the fuel and reductant will reach their minimum threshold before the trip distance to the selected destination is covered, at 214, an expected order of the fuel tank level and the urea tank level reaching respective minimum thresholds is determined. That is, an order of fluid level in the exhaust fluid tank reaching the exhaust fluid minimum threshold and fluid level in the fuel tank reaching the fuel minimum threshold is predicted. Herein, it is determined if the urea level is expected to reach the minimum urea threshold before the fuel level reaches the minimum fuel threshold, or vice versa. The order may be determined based on the fluid levels in the fluid tanks, the usage rates of the fluids, as well as the operating conditions. For example, the order may be estimated based on vehicle operating conditions including a mode of vehicle operation, the mode of operation including a fuel economy mode and a performance mode. As such, both the fuel tank and the exhaust fluid tank levels may increase and decrease together. That is, if you increase the usage of fuel, the usage of exhaust fluid will increase also. For example, if the operator requires more power from the car (such as during a full throttle condition) the threshold may be achieved earlier than expected or predicted for both fuel and exhaust fluid.

At 216, the routine includes, in response to the fluid level in each of the exhaust fluid tank and the fuel tank, providing the vehicle operator with one or more alternate driving route suggestions, the suggested driving route(s) including a refilling station. As elaborated above, the alternate routes are suggested in response to the fluid level in each storage tank, and more specifically in response to a fluid level in the exhaust fluid tank relative to an exhaust fluid minimum threshold, and in response to a fluid level in the fuel tank relative to a fuel minimum threshold. Providing alternate route suggestions includes providing a first route via a first refilling station when the exhaust fluid tank is at or below the exhaust fluid minimum threshold while the fuel is above the fuel minimum threshold. Herein, the exhaust fluid (e.g., urea) may run out before the fuel (e.g., diesel), or only the exhaust fluid may run out. In comparison, the controller may provide a second, different route via a second, different refilling station when the exhaust fluid tank is above the exhaust fluid minimum threshold while the fuel is at or below the fuel minimum threshold. Herein, the fuel may run out before the exhaust fluid, or only the fuel may run out. Further, the controller may provide a third route (different from each of the first and second routes, and also different from the current route) via a third, different refilling station (different from each of the first and second refilling stations) when the exhaust fluid tank is at or below the exhaust fluid minimum threshold and the fuel is at or below the fuel minimum threshold. Herein, both the exhaust fluid and the fuel may run out substantially simultaneously. In other words, different routes via distinct refilling stations are provided if the urea is expected to deplete first versus if the diesel fuel is expected to deplete first along the current route.

In one example, the first refilling station on the first suggested route (suggested when urea depletes earlier or when only urea is expected to run out) may be a refilling station that includes only exhaust fluid. In comparison, the second refilling station on the second suggested route (suggested when fuel depletes earlier or when only fuel is expected to run out) includes at least fuel. Herein, the refilling of urea is synchronized with the refilling of fuel to compensate for the less frequent availability of urea relative to fuel at refilling stations, even though refilling of urea is not immediately required. This allows the need for finding another refilling station to refill urea at a later time to be reduced. In contrast, the third refilling station may include each of fuel and exhaust fluid.

In the discussed examples, the fuel includes diesel and the exhaust fluid includes urea. However, it will be appreciated that in alternate examples, alternate combinations of fuel and reductant/exhaust fluid may be applied.

The suggested driving routes may be displayed to the vehicle operator, such as on a display on the center console of the vehicle and/or on a mobile/remote device that can access the information and take actions. The suggested driving routes displayed to the vehicle operator may be further selected based on user preferences stored in the controller's user profile. For example, the suggested driving routes and the refilling stations therein may be selected based on user preferences including, a non-limiting examples, fuel price, exhaust fluid price, refilling station preference, type of refilling facility available (bottle or pump), and exhaust fluid dealer preference. Further still, the selection may be based on a user's favorite gas station, traffic and parking preferences, as well as information from a user's social media network. For example, the controller may receive (and share) inputs regarding ranking (e.g., a crowd-sourced rank), dealer reliability, urea quality, opinions, reviews, discounts, prizes, etc., via a social media community or hub or via fleet control. These inputs may be received in real-time and used to adjust the refilling station and route suggestions in real-time. The information can be shown on a mobile application for those vehicles that does not have full functionality on their media center, or to a fleet control.

In some examples, in addition to selecting suggested driving routes based on various criteria including the user preferences, an order of displaying the suggested driving route(s) may be adjusted based on one or more of a user preference, minimum travel time, minimum fuel usage, and minimum urea usage. In one example, the alternate driving routes may be selected based on the user preference for a urea dealer and/or a fuel dealer, and then the selected driving routes may be displayed to the operator in an order of urea usage and/or fuel usage. Thus, a driving route with minimum fuel usage en route to the filling station may be displayed first. Alternatively, a driving route with minimum urea usage en route to the filling station may be displayed first. As still another example, a driving route with minimum travel time en route to the filling station may be displayed first. In this way, an order of presentation of the alternate driving routes may be adjusted based on vehicle fuel and reductant usage to minimize fuel and urea usage en route to the refilling station.

In one example, as elaborated at FIG. 3, the alternate driving routes may be provided on a vehicle customer interface wherein the different routes and refilling station characteristics are listed based on the amount of detour from the current route relative to the fluid range. An operator may indicate their selection via interactions with a touch display of the vehicle's center console and/or on a mobile/remote device that can communicate with the vehicle (example, smart phone using a mobile application) and can be used as the GPS device in case the vehicle does not have one enabled.

At 218, the routine includes receiving the operator selection. At 220, the controller may navigate the vehicle to the selected refilling station via the selected alternate route. Further, the controller may dynamically adjust the driving route suggestions as a driving parameter affecting the distance travelable on the current route changes. For example, while driving on the current route or on the alternate route (from 212 and 220, respectively), at 222, it may be determined if there is a change in driving conditions reducing the urea or fuel range. In one example, the urea and/or fuel range may be decreased in response to the operator transitioning from a fuel economy mode of vehicle operation to a performance (or sport) mode of operation. Upon confirmation of a change in driving conditions, at 224, the controller may suggest alternate routes via refilling stations that are closer still, or those that have the fluid that now needs to be refilled earlier.

For example, while on a first route, it may be determined that the diesel fuel range is limited. Accordingly, a second route via a refilling station having only diesel fuel may be selected. However, while on the second route, due to a change in driving pattern or conditions, the urea fuel range may become more limited. Accordingly, a third route, closer than the second route, where urea can be refueled may be provided. Alternatively, a third refilling station on the third route may be selected that has both urea and diesel available for refilling.

Optionally, at 226, the routine may further include reducing an engine performance to extend the fluid range of the almost depleted fluid till a refilling station. In one example, the engine performance may be reduced if the change in driving range reduced the urea range to a level where a refilling station is not accessible at the current urea usage rate.

It will be appreciated that while the routine shows dynamic adjustments to the range estimation and the providing of alternate driving routes, in alternate examples, the adjustments may be provided via a dedicated external application running on a vehicle media center or vehicle customer interface area and/or on a mobile/remote device that can access the information and take actions. The application may be intermittently coupled to an internet connection to receive updates, the updating synchronized with a mobile phone, tablet, or personal computer of the vehicle operator. Further still, the application may be synchronized so that the information can be accessed even when the operator is far from the vehicle if the vehicle synchronizes the latest information with the mobile application before it is turned off. In one example, the operator may use a mobile device running an application synchronized with the vehicle that is updated dynamically with information including, but not limited to, exhaust fluid tank level, diesel fuel tank level and vehicle usage conditions. The application may save the most recent information received by the vehicle, therefore the operator can access the information remotely from the mobile device and control the usage or plan a trip before return to the car or start the trip. In one other example, the fleet manager may use a computer synchronized with each vehicle of the trip receiving information from each one dynamically such as, but not limited to, exhaust fluid tank level, diesel fuel tank level and vehicle usage conditions. After the vehicle is turned off the application will save the latest information received. With this information the manager can better plan the usage and refilling of each of the vehicle.

Further still, the operator may be able to share information regarding the refilling to members on their social network or hub. For example, the operator may provide inputs regarding their experience at the selected refilling station, including a ranking and a review. This input may then be used by others when selecting a refilling station while driving their vehicle. The system database may also be filled with customer inputs from the given operator regarding their most recent refilling experience.

Returning to 210, if a trip is not set on the GPS device, the controller may monitor each of a fuel tank level and a urea tank level during vehicle operation and at 230, it may be determined if the fluid level in either tank has reached the respective minimum threshold. If yes, then at 232, as at 214, an order of the fluid levels reaching their minimum thresholds is determined. That is, it may be determined if the urea in the urea tank will reach the minimum urea threshold first or if the diesel in the fuel tank will reach the minimum fuel threshold first.

At 234, the routine includes notifying the operator about the low fluid level and the expected range of the low fluid. For example, the controller may indicate on the vehicle display which of the fuel and urea is low, and the expected range or distance with the fluid that is running low. At 236, as at 216, the controller may suggest possible refilling stations in the vicinity of the vehicle, as well as routes thereto, where the depleting fluid can be refilled. As discussed earlier, the refilling station suggestions provided may be based on the order of fluid exhaustion. For example, the refilling station suggestions may vary based on whether urea or diesel is reaching the respective minimum threshold.

In some examples, in addition to selecting suggested driving routes based on various criteria including the user preferences, an order of displaying the suggested driving route(s) may be adjusted based on one or more of a user preference, minimum travel time, minimum fuel usage, and minimum urea usage. Further, the order of presentation of the alternate routes and possible refilling stations may be adjusted based on which fluid needs to be refilled. As one example, when fluid refilling is triggered due to urea levels in the urea tank reaching a minimum urea threshold, the alternate driving routes may be selected based on the user's preference for a urea dealer, and then the selected driving routes may be displayed to the operator in an order of urea usage. Thus, a driving route with minimum urea usage en route to the filling station may be displayed first. In another example, when fluid refilling is triggered due to fuel levels in the fuel tank reaching a minimum fuel threshold, the alternate driving routes may be selected based on the user's preference for a fuel dealer, and then the selected driving routes may be displayed to the operator in an order of fuel usage, and optionally further based on urea usage. Thus, a driving route with minimum fuel usage, or a driving route with minimum fuel and urea usage, en route to the filling station may be displayed first. In still other examples, a driving route with minimum travel time or minimum travel distance en route to the filling station may be displayed first. In this way, an order of presentation of the alternate driving routes may be adjusted based on vehicle fuel and reductant usage to minimize fuel and urea usage en route to the refilling station.

Upon receiving the operator selection at 238, the controller may navigate the vehicle to the selected refilling station at 240 using the vehicle media center display of a mobile device as a GPS. In addition, if the minimum threshold is expected to be reached before the refilling station is reached, such as due to a change in driving behavior causing a further drop in fluid range, at 242, the controller may notify the operator of the imminent fluid depletion, thereby making the operator aware that they need to be careful of the way they drive or they may not be able to reach the refilling station. Further still, the controller may reduce the vehicle performance so that the vehicle operator is better able to arrive at the refilling station and avoid running on a dry tank.

Further still, the operator may be able to share information regarding the refilling to members on their social network or hub. For example, the operator may provide inputs regarding their experience at the selected refilling station, including a ranking and a review. This input may then be used by others when selecting a refilling station while driving their vehicle. The system database may also be filled with customer inputs from the given operator regarding their most recent refilling experience.

In one example, a method for a vehicle comprises monitoring each of a fuel tank level and a urea tank level; and suggesting navigational routes based on a usage rate of each of fuel and urea, and further based on an expected order of the fuel tank level and the urea tank level reaching respective minimum thresholds. Herein, the suggesting includes suggesting routes with a refilling station having each of urea and fuel if the urea tank level is expected to reach the minimum threshold before the fuel tank level, and suggesting different routes with a refilling station having fuel but not urea if the fuel tank level is expected to reach the minimum threshold before the urea tank level. The monitoring may be performed while the vehicle is operated on a first route to a destination, and suggesting navigational routes may include suggesting alternate routes to the destination via a refilling station. The suggesting may be further based on an expected range of each of the fuel and the urea along the first route, the expected range dynamically adjusted based on vehicle operation parameters including mode of vehicle operation. A controller may also provide an indication of the expected range of each of the fuel and the urea to a vehicle operator; and if the expected range is less than a distance covered on the route, reduce engine performance to extend the range.

Now turning to FIG. 3, example rerouting suggestions are illustrated at 300 and 350. In particular, 300 and 350 represent screenshots of a vehicle display where urea and fuel level and range is depicted to a vehicle operator, and based on those ranges, alternate routing suggestions are provided. It will be appreciated that a similar screen may be displayed on the synchronized mobile device, application, GPS and/or remote computer.

At 300, the display indicates that the vehicle operator has selected fuel economy as the mode of vehicle operation 302. During this mode, engine adjustments that favor reduced fuel usage are given preference, even if maximum power output is sometimes limited. The display further indicates at 304 that the vehicle is being navigated to a destination along a planned route, such as via the use of a GPS device. The trip details indicate the distance (32 miles) and time (45 mins) to the destination.

At 306, tank details for each of the fuel tank and the urea tank are displayed. In particular, based on the vehicle operating mode and the vehicle operating conditions, a usage rate of each fluid is determined. The tank details indicate that the urea level in the urea tank is closer to the minimum urea threshold (indicated by a dashed line slightly above the empty marker of the urea level gauge) and the urea range is about 25 miles at the current urea usage rate. In comparison, the fuel tank is almost half full with a fuel range of about 75 miles at the current usage rate.

Since the distance to the destination is more than the urea range, it may be determined that the urea tank may run dry by the time the destination is reached. This, urea tank refilling may be required before the destination is reached, but not fuel tank refilling. Accordingly, at 308, alternate driving routes to the same destination via refilling stations capable of providing urea are displayed. The alternate routes (routes A-C) are listed with a summary of the route and the amount of detour expected. In some examples, the suggestions may also list the brand of urea available at the urea refilling station, as well as the price of urea at the location. Further still, the vehicle operator may browse the selections to review further details regarding each option, such as traffic information to the station, reviews of the station provided by other users as well as members of the user's social network, and user reviews posted by the user on previous trips to the same refilling station.

In some examples, in addition to selecting suggested driving routes A-C based on various criteria including the user preferences, an order of displaying the suggested driving route(s) may be adjusted based on one or more of a user preference, minimum travel time, minimum fuel usage, and minimum urea usage. While the depicted example lists the routes with the route having the minimum distance to a refilling station listed first, in an alternate example, the first alternate driving route and refilling station option presented to the vehicle operator may include a route having minimum urea usage en route to the refilling station. In still other examples, a driving route with minimum travel time may be displayed first. Herein, by adjusting the order of presentation of the alternate driving routes to a urea refilling station based on urea usage (consumption) to the refilling station, urea usage efficiency is improved and the likelihood of the urea tank running dry before the urea refilling station is reached is reduced.

In this way, by enabling all the details about the refilling station to be retrieved, the customer is able to make an informed decision about which urea station they wish to refill at. In the current example, the user has selected Route B. Thus, on a subsequent screenshot, the controller may display navigational instructions to refilling station 2 via route B to the operator.

Now turning to the example at 350, the display indicates that the vehicle operator has selected performance as the mode of vehicle operation 352. During this mode, engine adjustments that favor increased vehicle performance are given preference, even if fuel economy is sometimes degraded. The display further indicates at 354 that the vehicle is being navigated to a destination along a planned route, such as via the use of a GPS device. The trip details indicate the distance (32 miles) and time (45 mins) to the destination.

At 356, tank details for each of the fuel tank and the urea tank are displayed. In particular, based on the vehicle operating mode and the vehicle operating conditions, a usage rate of each fluid is determined. The tank details indicate that the fluid levels in both the urea tank and the fuel tank are close to their respective minimum thresholds (indicated by a dashed line slightly above the empty marker of each tank fluid level gauge). Furthermore, the urea range is about 25 miles at the current urea usage rate while the fuel range is about 20 miles at the current usage rate.

Since the distance to the destination is more than each of the urea range and the fuel range, it may be determined that both the urea tank and the fuel tank may run dry by the time the destination is reached. In addition, based on the usage rate and range, it may be determined that the fuel tank may reach the minimum fuel threshold before the urea tank reaches the minimum urea threshold. Thus, fuel tank refilling may be required before urea tank refilling, both tanks needing to be refilled before the destination is reached. Accordingly, at 358, alternate driving routes to the same destination via refilling stations capable of providing fuel as well as urea are displayed. By identifying refilling stations having both fuel and urea, the need to stop once for refilling fuel and then stopping again for refilling urea is preempted. In other words, the controller may locate refilling stations where both fuel and urea are available so as to synchronize refilling of the different tanks and facilitate refilling operations. The alternate routes (routes D-F) are listed with a summary of the route and the amount of detour expected. In addition, suggested routes include routes to refilling stations where both fuel and urea are available (routes D-E) as well as those where only fuel (which is expected to exhaust first) is available (route F). In some examples, the suggestions may also list the brand of diesel and urea available at the refilling station, as well as the price of fuel and urea at the location. Further still, the vehicle operator may browse the selections to review further details regarding each option, such as traffic information to the station, reviews of the station provided by other users as well as members of the user's social network, and user reviews posted by the user on previous trips to the same refilling station.

In some examples, in addition to selecting suggested driving routes D-F based on various criteria including the user preferences, an order of displaying the suggested driving route(s) may be adjusted based on one or more of a user preference, minimum travel time, minimum fuel usage, and minimum urea usage. While the depicted example lists the routes with the route having the minimum distance to a refilling station listed first, in an alternate example, the first alternate driving route and refilling station option presented to the vehicle operator may include a route having minimum fuel usage en route to the refilling station. In still other examples, a driving route with minimum fuel and urea usage, or a minimum travel time may be displayed first. Herein, by adjusting the order of presentation of the alternate driving routes to a fuel refilling station based on fuel usage (consumption) to the refilling station, fuel usage efficiency is improved and the likelihood of the fuel tank running dry before the fuel refilling station is reached is reduced. In addition, by further adjusting the order of presentation of the alternate driving routes to a fuel refilling station based on urea usage (consumption) to the refilling station, urea usage efficiency is improved and the likelihood of the urea tank also running dry before the fuel refilling station is reached is reduced.

By enabling all the details about the refilling station to be retrieved, the customer is able to make an informed decision about which station they wish to refill fuel and/or urea at. In the current example, the user has selected Route D, opting to refill both fuel and urea at the same refilling station. Thus, on a subsequent screenshot, the controller may display navigational instructions to refilling station 11 via route D to the operator.

In one example, a vehicle system comprises an engine; a fuel tank for storing diesel fuel; a reductant tank for storing urea; and a controller with computer readable instructions stored on non-transitory memory and/or mobile device/GPS providing navigation information and internet/network connection. The controller may be configured for planning a first route to a destination based on operator input; and while travelling on the first route, estimating a urea range based on a rate of urea usage and a diesel range based on a rate of diesel usage. Further, if only the urea range is less than a distance to the destination along the first route, the controller may suggest a second alternate route to the destination via a urea refilling station. If the diesel range is less than the distance to the destination along the first route, the controller may suggest a third alternate route to the destination via a refilling station having urea and diesel. The diesel range being less than the distance to the destination may include only the diesel range being less than the distance or each of the diesel range and the urea range being less than the distance. Only the urea range being less than the distance may include a fluid level of the urea tank reaching a minimum urea threshold while a fluid level of the diesel tank remains above a minimum diesel threshold before reaching the destination, while only the diesel range being less than the distance includes a fluid level of the diesel tank reaching the minimum diesel threshold while a fluid level of the urea tank remains above the minimum urea threshold before reaching the destination. Herein, each of the urea range and the diesel range may be dynamically adjusted based on vehicle operation parameters affecting urea usage and fuel usage, the parameters including vehicle operation in one of a fuel economy and a performance mode. In addition, the refilling station may be further selected based on operator preferences including one or more of urea price, fuel price, filling station preference, fuel dealer, urea dealer, and refilling station ranking, type of refilling facility available (bottle or pump) on an operator social network.

The controller may further include a communication and/or synchronization module that communicatively couples the vehicle controller with a mobile device of the operator or an alternate computer. The communicative coupling enables the controller to present remotely the information gathered on the vehicle and displayed on the vehicle display. In addition, the data may be received on the vehicle operator's social media. Further, the media hub may be filled straight from the vehicle media interface, mobile device or mobile application with information pertaining to the refilling such as fuel and exhaust fluid price, availability, reliability, etc. The mobile device or GPS can also be used as a navigation device, allowing for internet and vehicle information to be interfaced constantly. For vehicles not fitted with fully functional media center and interfaces (such as vehicles configured with no GPS, no TouchScreen display, no internet, etc.), the mobile device may act as the main interface between the vehicle and the operator.

In this way, vehicle critical fluid usage information can be displayed and synchronized to help a customer with reductant fluid usage and refilling. The technical effect of using vehicle operating information to better gauge the usage range of a fuel available in a fuel tank and an exhaust fluid available in an exhaust fluid storage tank is that refilling can be better prompted to preempt reductant tank emptying before the vehicle reaches a refilling station. By displaying a usage range of fuel and reductant to a vehicle operator, as well as a geographic position in relation to refilling stations, routes to refilling stations where urea is easily available may be drafted and displayed to the operator. In addition, by synchronizing the navigational information with vehicle fluid sage range, the alternate routing information to refilling stations can be accessed only when needed, reducing time wastage. Overall, vehicle operation on an empty urea tank can be pre-empted.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle system, comprising:
    in response to an order of a fluid level in an exhaust fluid tank reaching an exhaust fluid minimum threshold and a fluid level in a fuel tank reaching a fuel minimum threshold,
        determining one or more alternate driving route suggestions, the driving route suggestions including a refilling station, and
        displaying the driving route suggestions to a vehicle operator via a display unit,
        wherein the driving route suggestions are determined based on a fuel usage and an exhaust fluid usage and the order;
    in response to vehicle operator selection of one of the driving route suggestions, navigating a vehicle to the refilling station indicated by the selected driving route suggestion; and
    in response to a vehicle range being less than a distance to the refilling station, adjusting an engine operating parameter to reduce engine performance.

2. The method of claim 1, wherein the order is estimated based on vehicle operating conditions including a mode of vehicle operation, the mode of vehicle operation including a fuel economy mode and a performance mode.

3. The method of claim 2, wherein the determination of the driving route suggestions is further based on user preferences, the user preferences including fuel price, exhaust fluid price, refilling station preference, exhaust fluid dealer preference, and a type of refilling facility available.

4. The method of claim 1, wherein the determination of the driving route suggestions includes,
    determining a first route via a first refilling station when the fluid level in the exhaust fluid tank is at or below the exhaust fluid minimum threshold while the fluid level in the fuel tank is above the fuel minimum threshold;
    determining a second route via a second refilling station when the fluid level in the exhaust fluid tank is above the exhaust fluid minimum threshold while the fluid level in the fuel tank is at or below the fuel minimum threshold, where the second route is different from the first route and the second refilling station is different from the first refilling station; and
    determining a third route via a third refilling station when the fluid level in the exhaust fluid tank is at or below the exhaust fluid minimum threshold and the fluid level in the fuel tank is at or below the fuel minimum threshold, where the third route is different from the first and second routes and the third refilling station is different from the first and second refilling stations.

5. The method of claim 4, wherein the first refilling station includes at least exhaust fluid, wherein the second refilling station includes at least fuel, and wherein the third refilling station includes each of fuel and exhaust fluid, wherein the first route has a minimum exhaust fluid usage, wherein the second route has a minimum fuel usage, and wherein the third route has a minimum fuel and exhaust fluid usage.

6. The method of claim 1, wherein fuel includes diesel and wherein exhaust fluid includes urea, and wherein an order of displaying the driving route suggestions is adjusted based on one or more of a user preference, minimum travel time, minimum fuel usage, and minimum urea usage.

7. The method of claim 1, further comprising indicating a distance travelable by a vehicle on a current route based on the fluid levels of the exhaust fluid tank and the fuel tank.

8. The method of claim 7, further comprising dynamically adjusting the driving route suggestions as a driving parameter affecting the distance travelable on the current route changes.

9. A method for a vehicle, comprising:
monitoring each of a fuel tank level and a urea tank level with respective fuel level sensors;
displaying suggested navigational routes via a display unit, the suggested navigational routes determined based on a usage rate of each of fuel and urea, an expected order of the fuel tank level and the urea tank level reaching respective minimum thresholds, and an expected range of each of the fuel and the urea along a first route; and
if the expected range is less than a distance covered on the route, reducing engine performance to extend the range by adjusting an engine operating parameter,
wherein the suggested navigational routes are routes which minimize a usage of one or more of the fuel and the urea.

10. The method of claim 9, wherein determining the suggested navigational routes based on the usage rate of each of fuel and urea comprises determining first routes with a refilling station having each of urea and fuel if the urea tank level is expected to reach the minimum threshold before the fuel tank level, and determining second, different routes with a refilling station having fuel but not urea if the fuel tank level is expected to reach the minimum threshold before the urea tank level, wherein the first routes minimize the usage of urea, and wherein the second routes minimize the usage of fuel.

11. The method of claim 10, wherein the monitoring is performed while the vehicle is operated on a first route to a destination, wherein the suggested navigational routes include alternate routes to the destination via a refilling station, and wherein the determination of the suggested navigational routes is further based on a detour amount from a current route.

12. The method of claim 9, wherein the expected range is dynamically adjusted based on vehicle operation parameters including mode of vehicle operation.

13. The method of claim 12, further comprising displaying an indication of the expected range of each of the fuel and the urea to a vehicle operator via the display unit.

14. A vehicle system, comprising:
an engine;
a fuel tank for storing diesel fuel;
a reductant tank for storing urea; and
a controller with computer readable instructions stored on non-transitory memory for:
planning a first route to a destination based on operator input;
while travelling on the first route, estimating a urea range based on a rate of urea usage and a diesel range based on a rate of diesel usage;
if only the urea range is less than a distance to the destination along the first route, suggesting a second alternate route to the destination via a urea refilling station; and
if the diesel range is less than the distance to the destination along the first route, suggesting a third alternate route to the destination via a refilling station having urea and diesel,
wherein the second alternate route comprises a route having a minimum urea usage and the third alternate route comprises a route having a minimum diesel usage, and
wherein, if the diesel range is less than a distance to the refilling station along the third alternate route or the urea range is less than a distance to the refilling station along the second alternate route, adjusting an engine operating parameter to reduce engine performance.

15. The system of claim 14, wherein the diesel range being less than the distance to the destination includes only the diesel range being less than the distance or each of the diesel range and the urea range being less than the distance.

16. The system of claim 15, wherein only the urea range being less than the distance includes a fluid level of the reductant tank reaching a minimum urea threshold while a fluid level of the fuel tank remains above a minimum diesel threshold before reaching the destination, and wherein only the diesel range being less than the distance includes a fluid level of the fuel tank reaching the minimum diesel threshold while a fluid level of the reductant tank remains above the minimum urea threshold before reaching the destination.

17. The system of claim 14, wherein each of the urea range and the diesel range is dynamically adjusted based on vehicle operation parameters affecting urea usage and diesel usage, the parameters including vehicle operation in one of a fuel economy mode and a performance mode, and wherein a refilling station is further selected based on a detour distance from the first route.

18. The system of claim 14, wherein a refilling station is further selected based on operator preferences including one or more of urea price, diesel price, filling station preference, diesel dealer, urea dealer, refilling station ranking, and a type of refilling facility available on an operator social network.

19. The method of claim 1, wherein the driving route suggestions are further based on an amount of detour from a current driving route.

* * * * *